United States Patent [19]

Stoehr

[11] Patent Number: 4,873,901
[45] Date of Patent: Oct. 17, 1989

[54] APPARATUS FOR CUTTING AND STRIPPING INSULATION FROM WIRE SEGMENTS HAVING DIFFERENT GAUGE CONDUCTORS

[75] Inventor: Herbert M. Stoehr, New Berlin, Wis.
[73] Assignee: Artos Engineering Company, New Berlin, Wis.
[21] Appl. No.: 245,359
[22] Filed: Sep. 16, 1988
[51] Int. Cl.[4] .............................................. H02G 1/12
[52] U.S. Cl. ..................................................... 81/9.51
[58] Field of Search .................................. 81/9.4, 9.51

[56] References Cited

U.S. PATENT DOCUMENTS

| | | | |
|---|---|---|---|
| 4,584,912 | 4/1986 | Gudmestad et al. | 81/9.51 |
| 4,653,160 | 3/1987 | Thorkildsen et al. | 29/564.8 |
| 4,713,880 | 12/1987 | Dusel et al. | 81/9.51 |

Primary Examiner—Roscoe V. Parker
Attorney, Agent, or Firm—James E. Nilles; Donald C. McGaughey

[57] ABSTRACT

An apparatus for cutting a portion of insulation adjacent the ends of wire segments having different gauge conductors for the purpose of stripping the cut portion therefrom. This apparatus includes a main frame; a workstation on the frame that presents a processing point at which the wire segment will be momentarily positioned during operation for cutting of the insulation as it follows a path of travel; a plurality of sets of cutting knives with each set having a cutting edge profile sized to cut the insulation on a specific gauge of conductor; and a mechanism for reciprocally mounting each of the sets of cutting knives on a position of the main frame to extend radially away from opposite sides of the processing point to circumferentially space all of said radially extending sets around the processing point and for causing reciprocal movement of the knives in each set toward the processing point to a closed cutting position and away from the processing point to enable selective energization of a set of knives properly sized to fit the gauge of the wire segment conductor then at the processing point. The apparatus may also include a mechanism for stripping the cut insulation portion from the conductor which includes a subframe pivotally mounted on the main frame with the sets of cutting knives being mounted on the subframe. The subframe is moved by an actuator in a direction generally parallel to the path of wire segment travel to strip the cut portion of insulation.

13 Claims, 7 Drawing Sheets

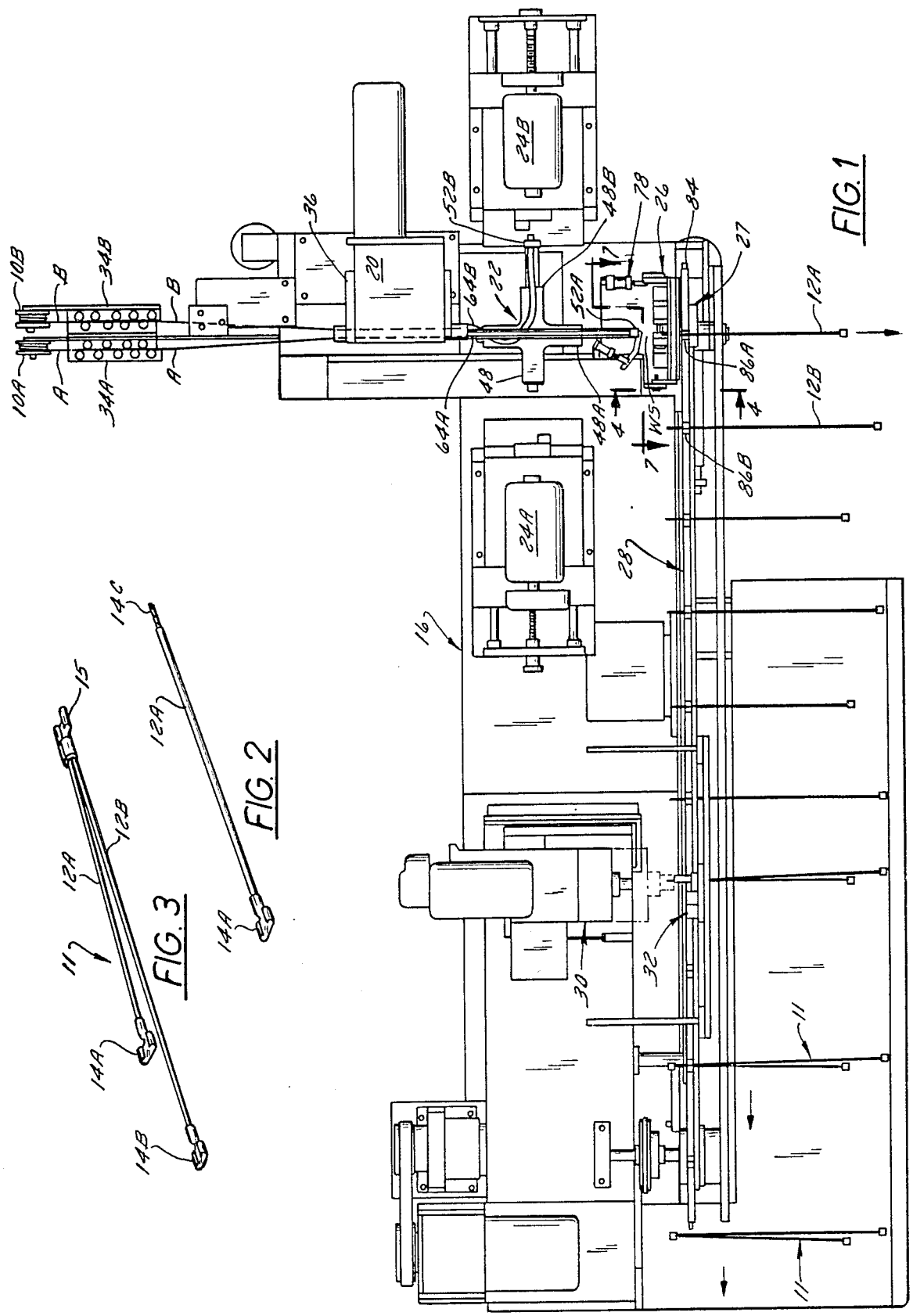

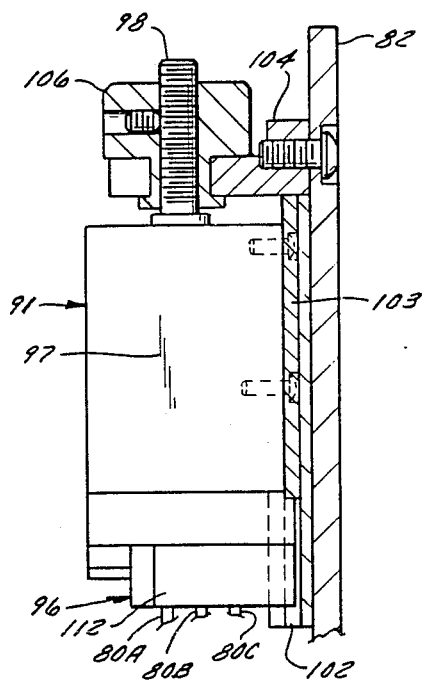
FIG. 10
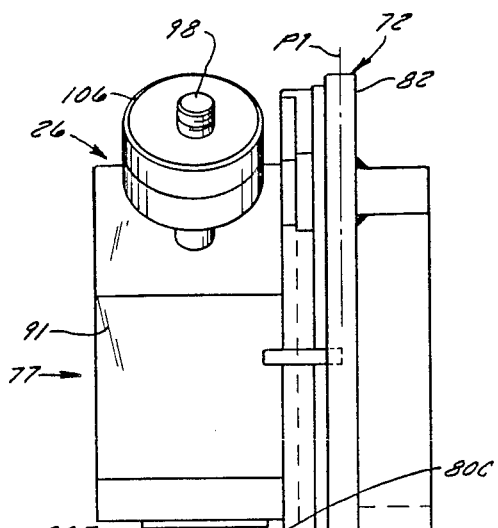
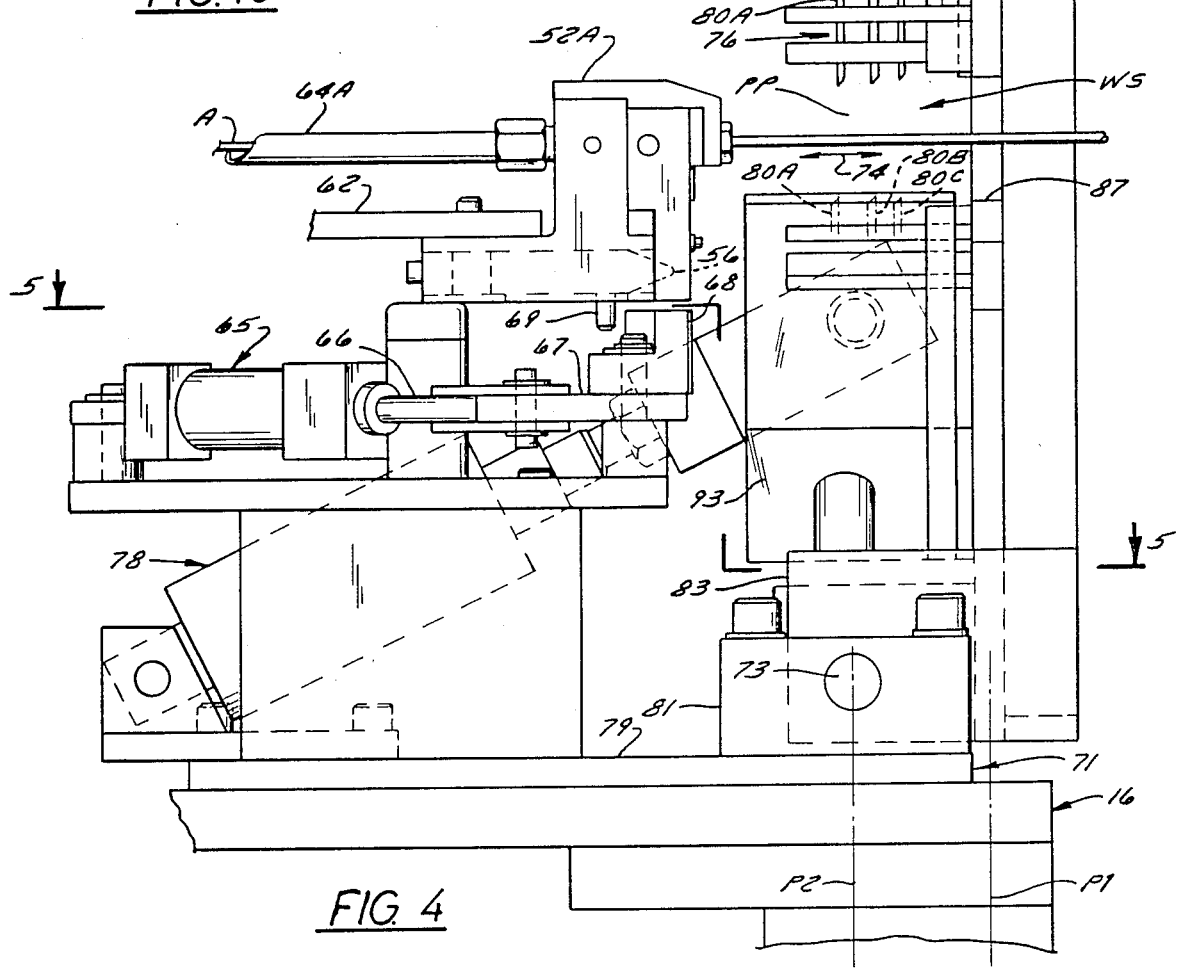
FIG. 4

APPARATUS FOR CUTTING AND STRIPPING INSULATION FROM WIRE SEGMENTS HAVING DIFFERENT GAUGE CONDUCTORS

BACKGROUND OF THE INVENTION

1. Field of the Invention

This invention relates generally to an apparatus for cutting an end portion of insulation surrounding a conductor of a wire segment and, if desired, stripping the insulation therefrom, and more specifically it relates to an apparatus in which the insulation on a plurality of wire segments, each having a different gauge conductor, can be completely cut around its entire periphery to permit subsequent stripping and use of the wire segment, for example, in multi-segment, multi-gauge wiring harnesses.

2. Description of the Prior Art

Prior art apparatus are known for feeding a wire strand along a path, cutting successive wire segments of desired length from the wire strand, cutting the insulation therefrom and, if desired, stripping the insulation and attaching wire terminals to one or both ends of the segments.

U.S. Pat. Nos. 4,713,880 issued Dec. 22, 1987 to Robert O. Dusel et al entitled "Lead Making Machine", and 4,653,160 issued Mar. 31, 1987 to Finn Thorkildsen et al entitled "Apparatus for Making Finished Wire Harness or Subassemblies Therefor", both assigned to the same assignee as the present application, are typical of this prior art. The prior art apparats may use wire stripper modules, such as Model CS-18 available from Artos Engineering, wherein a single pair of bypassing knives each having a V-shaped cutting profile are used to cut and strip insulation from the wire segment. The distance the knives bypass each other is programmable so that one set of knives can be used to cut the insulation on different gauge conductors. The use of V-shaped knives creates a diamond shaped cutting profile when the two knives overlap which cuts the insulation at only four points on the circumference of the segment wire thus always leaving some insulation uncut. These uncut portions must shear when the cut insulation portion (called a slug) is slid off the conductor. However, these uncut portions do not always easily shear and pulling can cause the entire wire segment to be pulled out of position, or cause the insulation remaining on the wire segment to be stretched to the extent it takes a set before it breaks resulting in an improper strip length. It is therefore preferable to use knives having a cutting profile with a semicircular notch sized to exactly fit the gauge of the conductor to be stripped so that two overlapping knives will completely cut the insulation around its entire circumference without cutting the conductor. The use of semicircular cutting profiles will avoid tearing and stretching of the insulation remaining on the wire segment as the insulation slug is slid off the conductor, but the disadvantage is that wire segments with only one gauge of conductor can be processed. To process a plurality of conductors of different gauges, a plurality of sets of knives each having a different size semicircular cutting profile must be used.

Thus, the problem is one of providing a mechanism that will quickly and efficiently permit shifting of the correctly sized set of knives to cut the insulation on a wire segment having one specific gauge conductor and to then be able to instantaneously select different sets of knives for cutting and stripping different gauge conductors which are subsequently presented at the same workstation so that groups of wire segments of different gauges are presented in a precise sequence for assembly into a wire harness. One prior art apparatus for using a plurality of sets of knives each having a different sized semicircular cutting profile is disclosed in U.S. patent application Ser. No. 238,590, filed on Aug. 31, 1988 by Kenneth A. Wollermann et al entitled "Apparatus for Cutting, Conveying and Programmably Stripping Wire Segments" and assigned to the same assignee as the present application. The apparatus in Ser. No. 238,590 mounts the plurality of sets of knives on an arcuate turret which in turn is mounted for horizontal back and forth reciprocation about an axis to place the proper set of knives at the workstation after which the knives are closed to cut the insulation which can then be stripped. While this apparatus performs very well, the pivotal reciprocation of the turret increases the size, complexity and cost of the cutting and stripping apparatus. It is desirable, therefore, to provide a wire stripping apparatus which will be simpler in design, smaller in size, have a reduced number of components and eliminate the need for the turret and associated driving and actuating mechanisms in order to reduce manufacturing costs, enable higher rate production speeds and achieve more efficient production.

SUMMARY OF THE INVENTION

The present invention provides an improved apparatus for cutting insulation adjacent the ends of wire segments having different gauge conductors and, if desired, for stripping the cut portion of insulation axially from the conductor.

In accordance with the invention, the apparatus includes a frame; a workstation on the frame that presents a single processing point at which the wire segment will be momentarily positioned for cutting of the insulation as the segment follows the path of travel during processing; a plurality of sets of cutting knives, with each of the set of knives having a cutting edge profile sized to cut the insulation on a specific gauge of conductor which the insulation surrounds; a means for reciprocally mounting each of the sets of cutting knives on the frame to extend radially away from opposite sides of the processing point to circumferentially space all of said sets around said processing point and for causing reciprocal movement of the knives in each set toward said processing point to a closed cutting position to cut the insulation and away from the processing point to an open position to enable selective activation of a set of knives during operation that is properly sized to fit the gauge of the wire segment conductor then at the process point uncut.

Preferably the apparatus also includes a stripping means for causing said cut portion of insulation to be stripped axially from the conductor.

In a further aspect of the invention, the apparatus includes a subframe which is pivotally mounted on a main frame for movement relative thereto in a stripping direction which is generally parallel to the path of travel, with the sets of cutting and stripping knives being mounted on the subframe. The stripping means for causing the cut portions of insulation to be stripped axially from the conductor includes an actuator means mounted between the main frame and the subframe for selective energization when any one set of knives is in said closed position to move the subframe in said stripping direction to cause the closed knives to strip the cut portion of insulation axially off the end of the conductor of the wire segment then at the workstation. Preferably the subframe is mounted on the main frame to extend at a generally right angle to a main frame and to the path of travel of the wire segment.

BRIEF DESCRIPTION OF THE DRAWINGS

FIG. 1 is a top plan view of a wire processing installation which includes an apparatus for cutting and stripping a portion of insulation in accordance with the invention;

FIG. 2 is an isometric view of one typical wire segment that can be fabricated by the installation of FIG. 1;

FIG. 3 is an isometric projection of one typical wire harness comprising two wire segments of the type shown in FIG. 2 and doubled by installation of a suitable terminal;

FIG. 4 is a partial side elevational view of the cutting and stripping apparatus according to the present invention taken along line 4—4 of FIG. 1;

FIG. 10 is a side elevational view partially in section taken along line 10—10 of FIG. 7;

DESCRIPTION OF THE PREFERRED EMBODIMENT

The Wire Processing Installation

Figure 5:
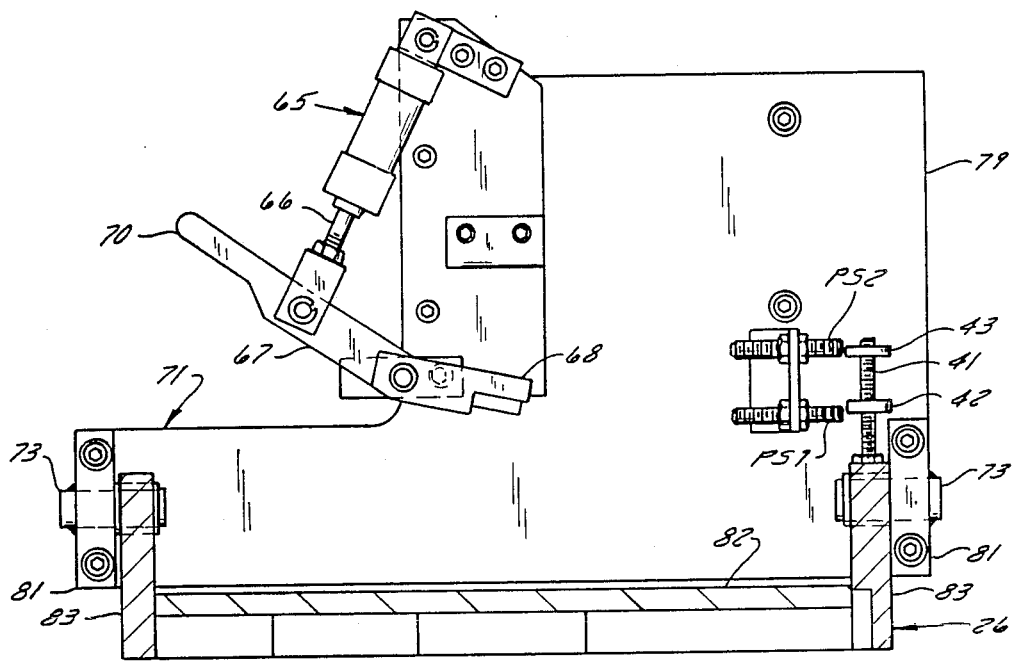
FIG. 5 is a partial plan view taken along line 5—5 of FIG. 4.

FIG. 1 shows a wire processing installation utilizing a cutting and stripping apparatus constructed in accordance with the present invention for processing two wire strands A and B having different gauge conductors which are fed from separate wire supplies through cam locks 10A and 10B, respectively. The end product of the installation could be groups of wire segments such as the segment 12A shown in FIG. 2 having different gauge conductors, having terminated ends 14A or stripped unterminated ends 14C, or having insulation portions which are cut but unstripped for subsequent assembly into a product or into a wiring harness for use in a product. End product of the apparatus could also be a wiring harness such as wire harness 11 shown in FIG. 3 which comprises a wire segment 12A having one gauge of conductor, a wire segment 12B having a different gauge of wire conductor, single wire terminals 14A and 14B connected to one end of each segment 12A and 12B, respectively, and a common wire terminal 15 connected to the other ends of both segments 12A and 12B.

The wire strands A and B are insulated wire strands from which the insulation must be cut or cut and stripped prior to terminal attachment. In some instances the manufacturer may desire groups of wire segments each having a different gauge conductor and with the insulation cut and stripped or cut but not stripped so that the cut insulation portion will keep a multi-stranded conductor from fraying during shipping and handling.

The present insulation generally comprises a rigid support structure 16. A wire feed mechanism 20; a wire placement mechanism 22; first and second terminal attachment mechanisms or presses 24A, 24B; a wire cutting and stripping apparatus 26; a wire gathering mechanism 27; a conveyor mechanism 28; a third terminal attachment mechanism or press 30; and a wire lifter or doubler mechanism 32 are mounted on support structure frame 16.

The wire feed mechanism 20 alternately feeds the two wire strands A and B. The wire placement mechanism 22 has a pivotable turret 48 with two spaced apart jaws 52A and 52B thereon which are located downstream of the wire feed mechanism 20. The first and second attachment terminal presses 24A, 24B are located on opposite lateral sides of turret 48 at right angles to the path of travel of the wire strands A and B. The cutting and stripping apparatus 26 is located downstream of the turret 48. The wire gathering mechanism 27 is located downstream of the cutting and stripping apparatus 26. The conveyor mechanism 28 has a succession of spaced apart conveyor clamps, such as clamps 86A, 86B, and is located downstream of the cutting and stripping apparatus 26 and beneath the wire gathering mechanism 27. The third terminal attachment mechanism or press 30 is positioned alongside the conveyor mechanism 28 at a location downstream of the wire cutting and stripping apparatus 26. The wire lifter or doubler mechanism 32 is also disposed at the sam location as the third terminal attachment press 30.

The general operation of the wire processing installation will be described first and then the components will be further described in more detail. In operation, the wire feed mechanism 20 alternately feeds one of the two wire strands, for example strand A, through the wire placement mechanism 22, through the cutting and stripping apparatus 26, and through the wire gathering mechanism 27 and over the conveyor mechanism 28, while the wire placement mechanism 22 simultaneously presents the free end of the other wire strand, for example strand B, which has previously been stripped, to the terminal press 24B for attachment of a terminal 14B thereto. After a desired length of strand A has been fed along the path of travel to the process point PP at workstation WS, the strand A is gripped by conveyor clamp 86A and a wire segment 12A of desired length is severed therefrom by the cutting and stripping apparatus 26 which will be more completely described hereinafter. The turret 48 of the wire placement mechanism 22 is then rotated to present the newly severed and stripped free end of wire strand A that is held by jaw 52A to the other terminal press 24A for attachment of terminal 14A thereto, while the wire feed mechanism 20 feeds the now terminated free end of the other wire strand B through wire placement mechanism 22 through cutter stripper mechanism 26 and through the wire gathering mechanism 27. After a desired length of strand B has been fed and a wire segment 12B of desired length is severed therefrom, the entire above described cycle is repeated. After each wire segment 12A and 12B has been severed it is moved by its respective conveyor clamp 86A, 86B to a location adjacent the third terminal press 30 where it is gripped by a lifter jaw (not shown), released by its conveyor clamp 86A, raised by the lifter jaw and held in this raised position. When the next successive wire segment 12B that has been cut from strand B reaches the same location, it is below and closely adjacent the raised wire segment 12A held in lifter jaw. The unterminated ends of both wire segments 12A and 12B are thus presented in side-by-side relation to the third press 30 for attachment of the common terminal 15 thereto. Thereafter the finished wire harness 11 is transported by the conveyor mechanism to a point of discharge.

Wire Feed Mechanism

Referring to FIG. 1, the wire feed mechanism 20 comprises a pair of conventional wire straightener devices 34A and 34B; a wire shifter device 36 which is selectively operable to move wire strands A and B transversely to the path of travel; and the wire feeding device 20 which is selectively operable to feed either wire strand A or B alternatively in response to the position of the wire strand as determined by shifter device 36. Thus the wire feed mechanism will advance either wire strand A or wire strand B. The amount of time a wire strand is advanced can be set and will determine the length of the wire segment.

Wire Placement Mechanism

Figure 6:
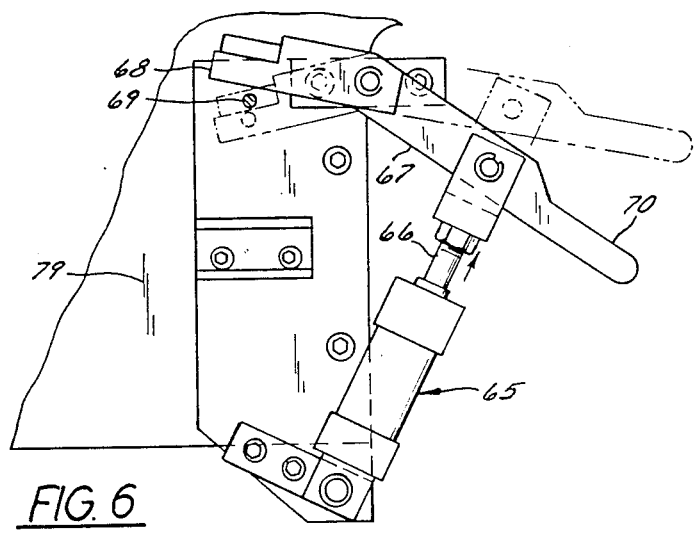
FIG. 6 is an enlarged view of a portion of the cutting and stripping apparatus as shown in FIG. 5 showing the actuating mechanism in another position of adjustment.
Figure 15:
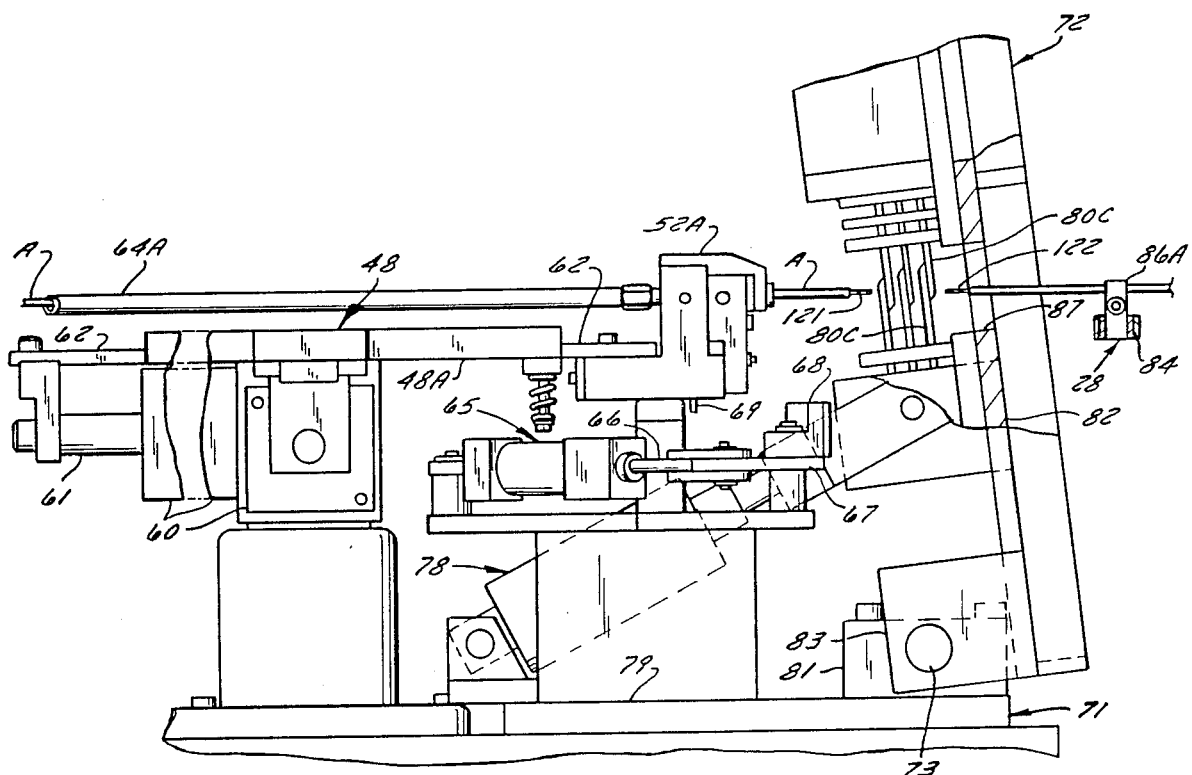
FIG. 15 is a side elevation of the cutting and stripping mechanism shown in FIG. 14 illustrating a still further operational position thereof.

Referring to FIG. 1, the wire placement mechanism 22 includes a turret 48 having arms 48A, 48B and an actuator, not shown, operable to pivot or rotate the turret through an arc of 90° between two positions thus placing jaws 52A either at press 24A or workstation WS and jaws 52B at workstation WS or press 24B. Flexible wire guide tubes 64A and 64B are mounted on arms 48A and 48B, and wire strands A and B extend through the wire guide tubes 64A and 64B. The turret jaws 52A and 52B, normally biased to a closed position, are mounted on the turret arms 48A and 48B in arcuate spaced relation from each other by 90° and are connected to wire guide tubes 64A, 64B, respectively. Actuators 56 are selectively operable to open and close the turret jaws 52A and 52B, respectively. The actuators 56, FIG. 4, are activated by piston and cylinder energizer assembly 65 best shown in FIGS. 4 and 6. The energizer assembly 65 includes a piston 66 connected to a pivoted lever arm 67 which has one end 68 positioned to engage a pin 69 on actuator 56 to open an associated turret jaw. Energizer 65 temporarily opens the turret jaw to allow the wire strand to advance therethrough. The lever arm 67 includes a handle 70 permitting the jaws to be manually opened. Actuators 60, each having a piston rod 61 (only one of which is shown and best seen in FIG. 15), connected to a transfer bar 62 are also provided to move the turret jaws 52A, 52B in a horizontal direction toward and away from the terminal presses 24A and 24B and the knives 75, 76 to effect cutting and stripping as will be more fully explained hereinafter.

Wire Cutting and Stripping Apparatus

Figure 7:
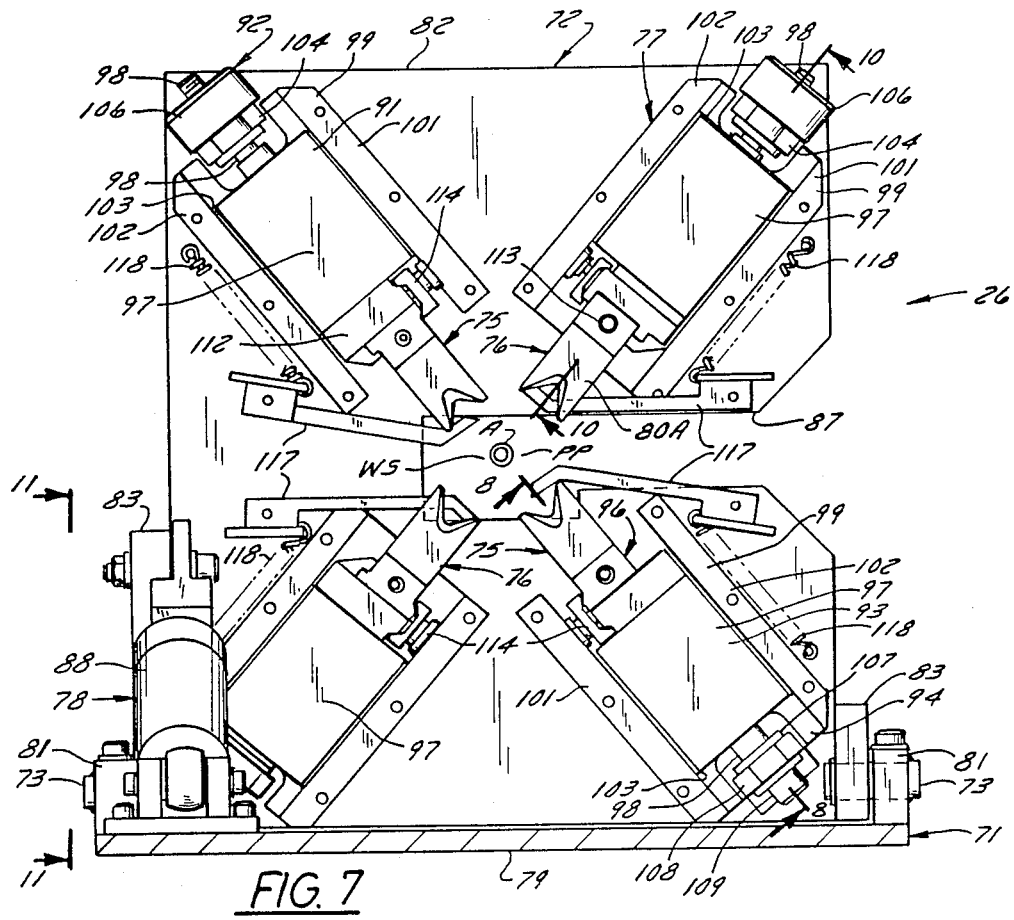
FIG. 7 is a partial front elevational view of the cutting and stripping apparatus shown in FIG. 4.
Figure 12:
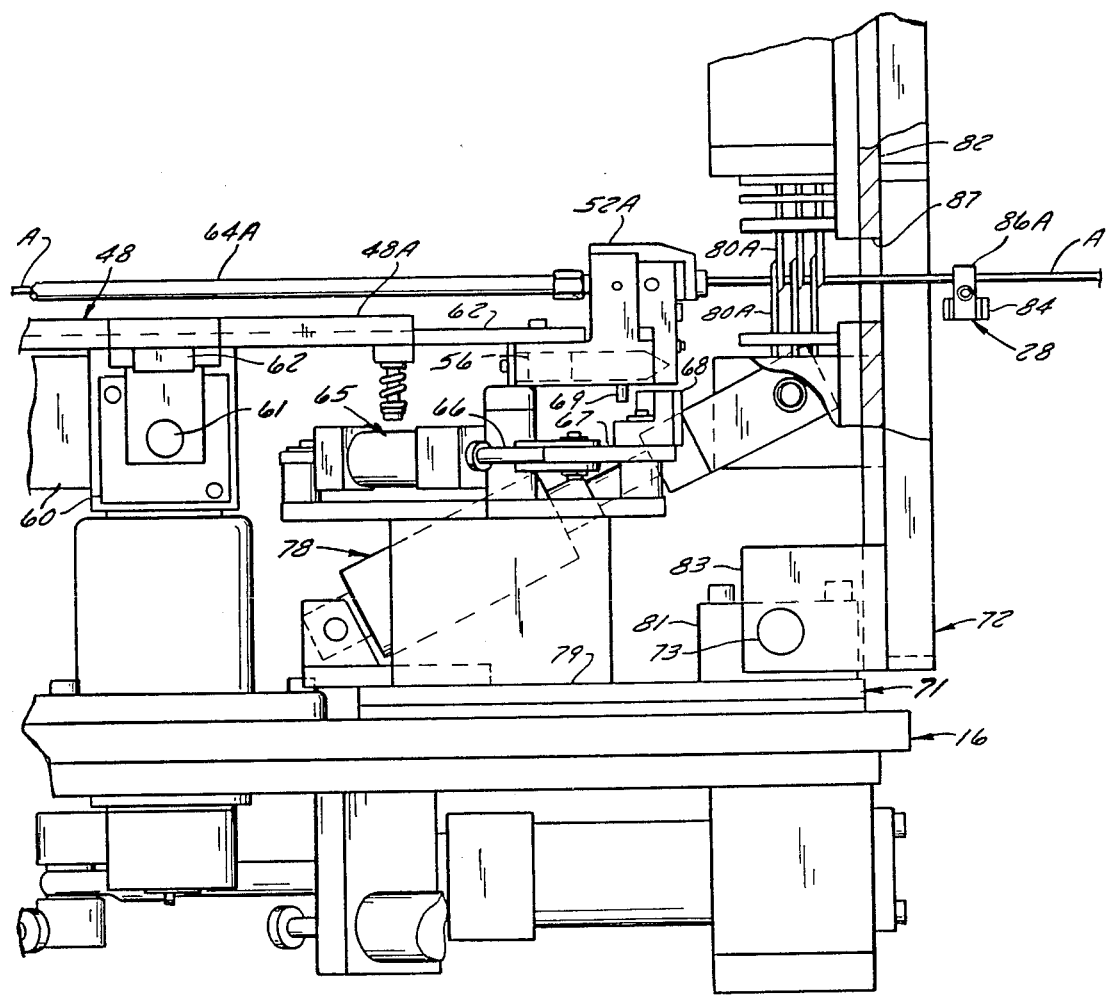
FIG. 12 is a side elevational view similar to FIG. 4 but showing the cutting and stripping apparatus in another operational position.
Figure 11:
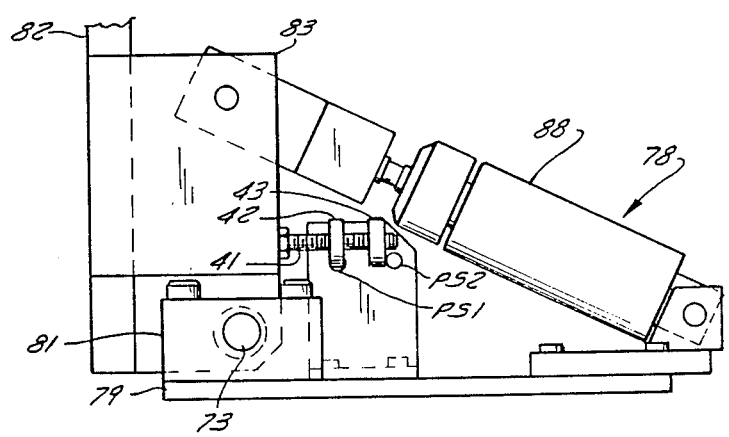
FIG. 11 is a partial side elevational view taken along line 11—11 of FIG. 7.

Referring to FIGS. 4, 5 and 7, the apparatus 26 for cutting a portion of the insulation adjacent the end of wire segments having different gauge conductors for the purpose of ultimately stripping the cut portion of insulation comprises a main frame 71; a subframe 72 pivotally mounted on the main frame by means of laterally spaced apart pivot pins 73 for movement relative to the main frame in the direction of arrow 74 generally parallel to the path of travel of the wire segments; a workstation WS on the main frame that presents a processing point PP at which a wire strand A or B will be momentarily positioned for cutting and stripping as it follows a path of travel through the installation; a plurality of sets of cutting and stripping knives 75, 76; a means 77 for reciprocally mounting each of the sets of cutting and stripping knives 75, 76 on the subframe 72 to extend radially away from opposite sides of the processing point PP and for causing reciprocal movement of the opposed knives in each set towards the processing point PP to a closed position (FIGS. 12 and 13) to cut insulation surrounding a conductor and away from the processing point to an open position; and a stripping means 78 for causing the cut portion of insulation, if desired, to be stripped axially from the conductor.

With reference to FIGS. 4 and 7, the main frame 71 includes a base plate 79 which is rigidly secured to the support structure 16 of the installation. The base plate 79 includes a pair of laterally spaced pivot support bosses 81 secured thereto as by bolting. The subframe 72, which constitutes a portion of the main frame, includes a vertically extending plate 82 having a pair of laterally spaced pivot pin support members 83 mounted at the lower portions thereof in which the pivot pins 73 are mounted. The pivot pins 73 extend from members 83 and are rotatably secured in the pivot bosses 81. The subframe 72 is pivotally mounted on the main frame 71 to lie in a first plane P1, FIG. 4, which extends at a generally right angle to the main frame 71 and at a right angle to the path of travel of the wire strand A or B as it passes through the workstation. The subframe plate 82 has a horizontally extending slot 87 which defines a workstation WS and processing point PP. An actuator means in the form of a piston and cylinder assembly 88 is connected between the base plate 79 and the subframe vertical plate 82. The piston and cylinder assembly 88, the vertical plate 82 and the pivot pins 73 constitute the stripping means 78 for moving the subframe to cause the cut portion of insulation to be stripped axially from the conductor of a wire segment. Expansion and contraction of the piston and cylinder assembly 88 will move the subframe plate 82 in the direction of arrow 74 generally parallel to the path of travel of the wire segment when stripping of a wire segment is required as will be more fully explained hereinafter. Proximity switches PS1 and PS2 are mounted on main frame plate 79 and are connected to a central processing control not shown. A threaded stud 41 is rigidly mounted on and moves with subframe 72 when it pivots. Elements 42, 43 which can be sensed by proximity switches PS1, PS2 are adjustably mounted on threaded stud 41 and act in cooperation with proximity switches PS1 and PS2 to indicate home position and the pivoted strip position of subframe 82.

Figure 13:
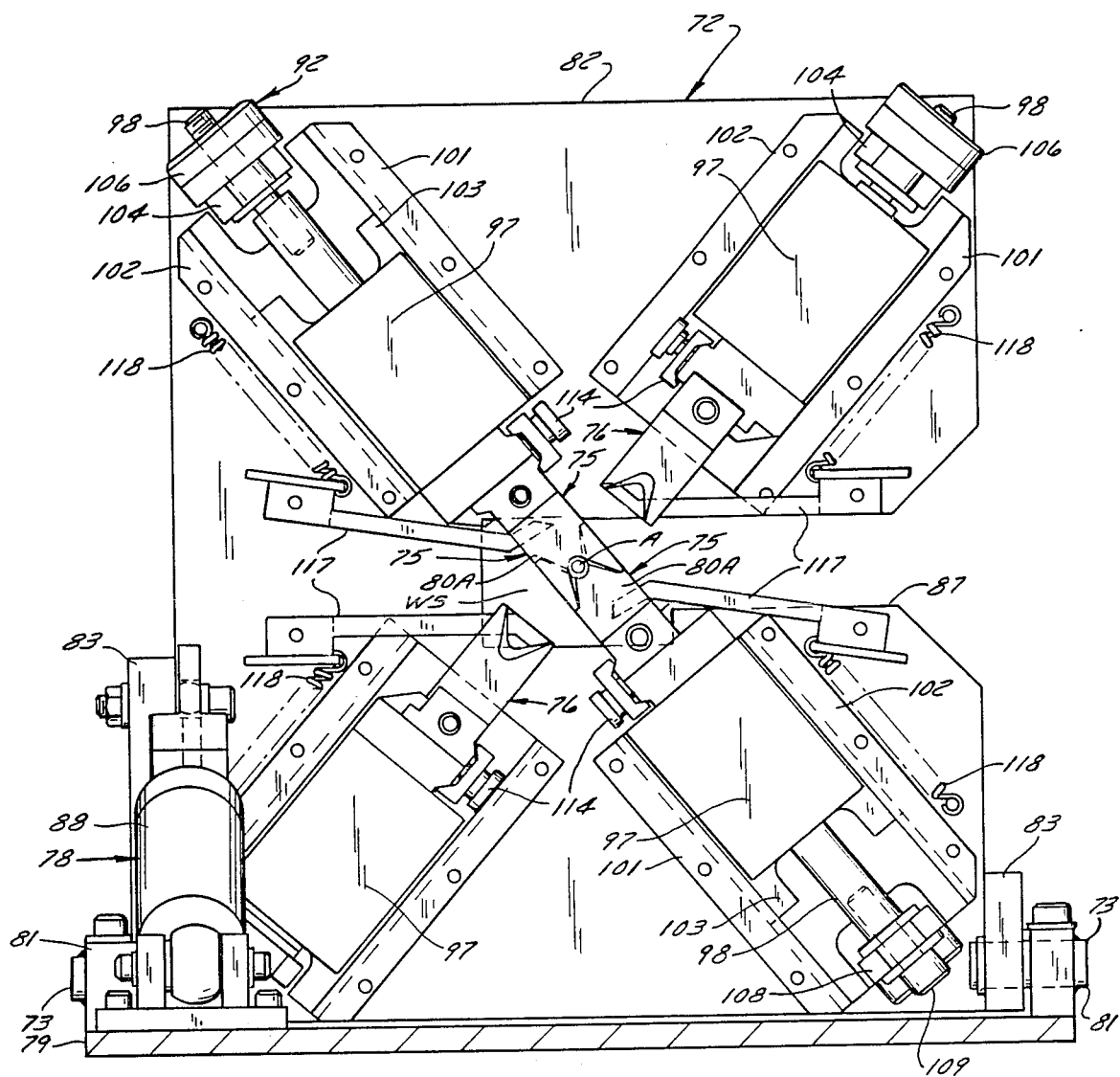
FIG. 13 is a front elevational view of the cutting and stripping apparatus similar to FIG. 7 showing the cutting knives in the operational position corresponding to the position shown in FIG. 12.

As best shown in FIG. 7, a plurality of sets of cutting knives 75, 76 are arranged on the subframe plate 82 to extend radially away from opposite sides of the processing point. As shown in FIG. 7, two sets of cutting and stripping knives 75, 76 are shown but more than two sets could be used if desired. Each set of knives 75, 76 preferably includes groups of three upper and three lower knives 80A, 80B, 80C in spaced opposed relation to each other at radially opposite sides of the process point PP. Thus the upper and lower groups of knives comprising set 75 are in diametric alignment and similarly the upper and lower groups of knives comprising set 76 are in diametric alignment. The upper and lower knives 80A, 80C in each group each have a cutting edge profile containing a semicircular notch sized to fit around approximately 180° of a specific gauge of conductor so that the insulation surrounding the conductor will be cut through without cutting the conductor. The knives 80B are severing knives having no notch and are designed to cut through both the insulation and the conductor. The knives 80A, 80B, 80C in the upper group are aligned to bypass the knives 80A, 80B, 80C in the lower group in face-to-face relation thereto. When the upper and lower groups of knives which comprise a set, such as set 75 in FIG. 13, are closed, upper and lower knives 80A and 80C will each define a circular cutting profile that will cut the insulation around the entire periphery of the conductor without cutting the conductor. While three upper and three lower knives 80A, 80B, 80C are shown, each set of knives could comprise only a single upper and a single lower stripping knife such as upper and lower knives 80A or two upper and two lower knives such as knives 80A and 80B.

The means 77 for reciprocally mounting each of the sets of cutting knives 75, 76 are the same in construction, and therefore only one such means will be described. Referring to FIGS. 4 and 7, the means 77 for reciprocally mounting each set of cutting knives on the subframe lies in a second plane P2 which is in spaced parallel relation to first plane P1 and includes a first upper transducer 91; an upper attachment means 92 for adjustably mounting the transducer 91 on the subframe plate 82; a second lower transducer 93; a lower attaching means 94 for fixedly mounting the lower transducer 93 on the subframe plate 82; and a knife fastening means 96 for securing each of the sets of cutting knives 75, 76 to their respective transducer.

More specifically with reference to FIGS. 7, 8, 9 and 10, each of the transducers 91, 93 has a cylinder member 97 and a piston member 98 reciprocally mounted in the cylinder member. The cylinder member 97 of each transducer is mounted for reciprocal movement relative to the subframe vertical plate 82 by means of a mounting frame 99. The mounting frame 99 includes a pair of spaced apart parallel slide rails 101, 102 therein and is secured to the base frame as by bolting or riveting. Each cylinder 97 includes a slide plate 103 which is mounted in and retained by the slide rails 101, 102. The piston rod 98 of the first upper transducer 91 (FIG. 10) has a threaded free end which passes through an upper yoke 104 fixedly mounted on plate 82. An adjusting knob 106 is rotatably mounted in the mounting yoke 104 and threadably engages the end of the threaded piston rod 98. Rotation of the adjusting nob 106 will move the first transducer 91 up and down to adjust the clearance between opposed cutting and stripping knives of each set 75, 76.

Figure 8:
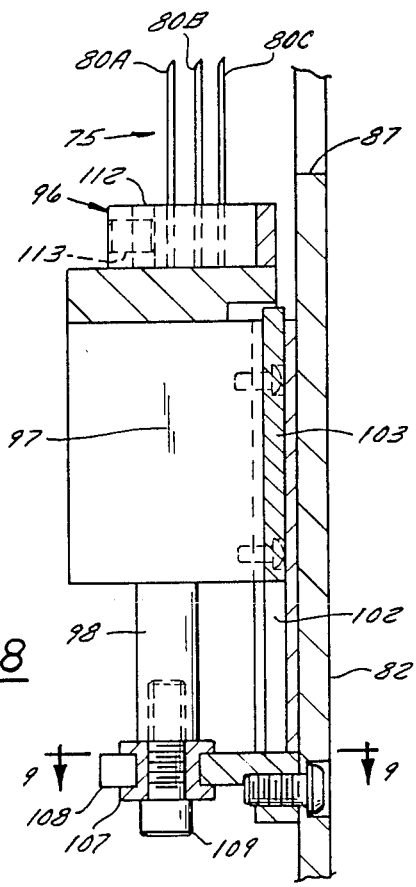
FIG. 8 is a side elevational view partially in section taken along line 6—6 of FIG. 7.
Figure 9:
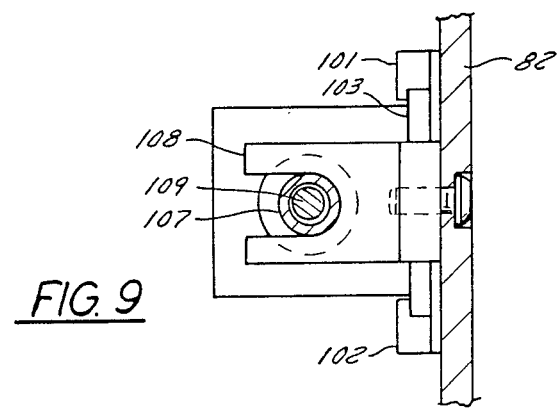
FIG. 9 is a sectional view taken along line 9—9 of FIG. 8.

The second lower transducer 93 also includes a cylinder member 97 and a piston member 98 identical in construction to that of the upper transducer. However, the free end of the lower piston rod 98 is internally threaded, as shown in FIG. 8, and is connected to a spool 107 which is carried in a lower yoke 108 fixedly mounted on plate 82. A cap screw 109 is threaded into the end of the piston rod to retain the spool 107 on the yoke 108. No adjustment of the lower end of the lower piston rod 98 is necessary.

The means 77 for mounting each group of knives 80A, 80B, 80C on each cylinder 97 includes a knife fastening means 96 (FIGS. 7, 8 and 10). The knife fastening means 96 includes a slotted holder 112 into which the knives are mounted and secured by a retainer 113. Spacers are placed between the knives 80A, 80B and 80B, 80C and the width of the spacer determines the length of the insulation portion that will be cut and stripped. The holder 112 is secured to the cylinder by a clamp and thumb screw assembly 114. If the cutting and stripping apparatus were only going to be used to cut the insulation portion from wire segments, it would be possible for each set of knives to comprise a single upper and lower knife. However, for the purpose of high speed production it is desirable for each set of knives to include groups of three upper and three lower knives 80A, 80B, 80C as previously described.

Referring to FIG. 7, an insulation slug stripping member 117 is pivotally mounted on plate 82 between each group of knives 80A, 80B, 80C which will strip the insulation slugs from between the knives as they are withdrawn to their open position. Each member 117 is biased to its operative position by a tension spring 118.

Figure 14:
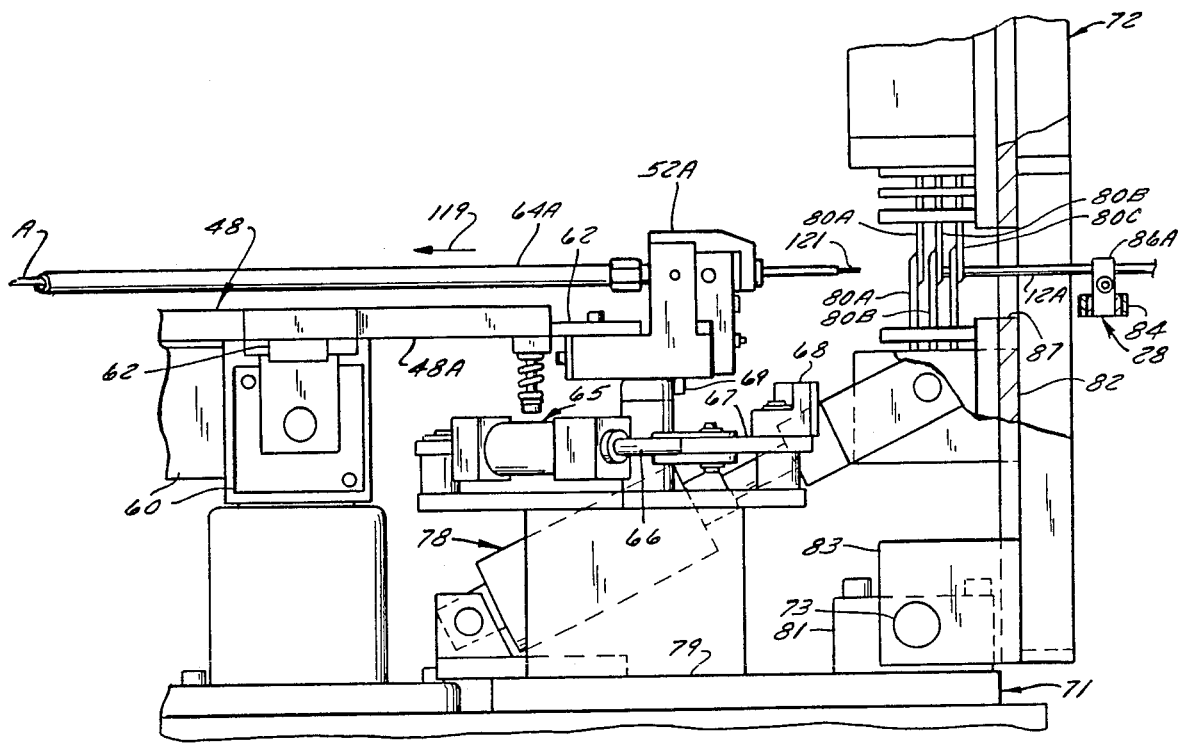
FIG. 14 is a side elevational view of a cutting and stripping apparatus similar to that of FIG. 12 showing a further position of operation.

The operation of the cutting and stripping mechanism 26 will now be described. Referring to FIG. 4, when a desired length of wire strand, for example strand A, has been extended through the cutting and stripping mechanism 26, the actuator 65 will be operated to close the associated turret jaw 52A. The set of cutting knives 75 that is properly sized to cut the insulation but not the gauge of the wire conductor of strand A then at the processing point PP will be actuated by actuating the upper and lower transducers 91, 93 to cause the upper and lower cylinders 97, 93 to move towards each other and close the knives 75 to the position shown in FIG. 14 to sever the wire segment 12A and cut only through the insulation portion at a predetermined strip length on each side of the severed conductor. After severance of the conductor, the set of knives 75 remains in a closed position and the turret jaw 52A, which is closed in clamping relation to wire strand A, is retracted in the direction of arrow 119, shown in FIG. 14, toward the upstream end of the path of wire strand travel. As wire strand A is retracted, closed knives 80A will effect stripping of insulation from the newly severed end 121 of the wire strand A which remains connected to the wire cam lock 10A. After the end 121 of wire strand A is stripped, as shown in FIG. 14, stripping means actuator 78 is energized to pivot subframe 72 relative to main frame 71 to the position shown in FIG. 15. As all of the knives still remain closed, the right-hand set of knives 80C will cause the cut insulation slug to be slid axially off of the end 122 of severed wire segment 12A. During the stripping operation, wire segment 12A will be clamped in a fixed position and held against axial movement so that stripping operation of the insulation slug will occur. After the cutting and stripping action above-described, the knives will be moved back to their open position and the subframe 72 returned to its vertical position, shown in FIG. 4, ready to receive the wire strand B. The turret 48 will be rotated to present the stripped end of the wire strand A at terminal press 24A while at the same time new unsevered wire strand B will be advanced through the processing point PP and placed in position for severing and stripping. If the wire strand B has a different gauge of conductor, a second and different set of knives 76, sized to fit the conductor, will be energized to sever and cut the insulation on the strand B in the same manner as previously described regarding strand A. As each set of knives 75 or 76 returns to their open position, the insulation slug stripping member 117 interposed between the blades will comb out the insulation slugs from between the knives to prevent jamming during the next cutting cycle.

If wire strands of more than two different gauges of conductors were being processed, it would be possible to mount additional sets of cutter knives on the subframe by moving the assemblies radially outward to provide more circumferential space for mounting the additional assemblies required.

Conveyor Mechanism

Referring to FIG. 1, the conveyor mechanism 28 comprises an endless flexible conveyor chain 84 provided with the separable conveyor clamps 86A and 86B which are spaced apart from one another along the chain. Each clamp 86A, for example, is adapted to receive wire strand A and to releasably grip and convey the wire segment 12A cut therefrom. Each clamp 86B is adapted to receive wire strand B and to releasably grip and convey a wire segment 12B cut therefrom. Each conveyor clamp 86A, 86B is actuatable between an open and closed position. In the open position the clamp will receive the wire strand and then subsequently release it. In the closed position it will grip the wire strand while the wire strand is being severed and stripped. Chain 84 is driven in steps or increments so each conveyor clamp 86A, 86B will move, while open, to the receiving point directly opposite the outlet end of the cutting and stripping mechanism 26. Clamp 86A or 86B will be closed to clamping the wire segment 12A or 12B therein and then moved along the conveyor path in steps until it reaches the third terminal attaching press 30 where a terminal similar to 14A or 14B will be applied to the stripped end of individual wire segments opposite to terminals 14A or 14B as shown in FIG. 2 or a terminal 15 will be applied to double the ends of the wire segments together as shown in FIG. 3. After the terminals are applied, the wire segments are conveyed to a discharge location where the conveyor clamps 86A, 86B open to discharge the wire segments.

What is claimed is:

1. An apparatus for cutting a portion of insulation adjacent the ends of wire segments having different gauge conductors for the purpose of stripping said cut portion from said conductor comprising:
    a main frame;
    a workstation on said frame presenting a processing point at which said wire segment will be momentarily positioned for cutting said insulation as said segment follows a path of travel during processing;
    a plurality of sets of cutting knives, each of said sets of knives having a cutting edge profile sized to cut the insulation on a specific gauge of conductor; and
    means for reciprocally mounting each of said sets of cutting knives on said main frame to extend radially away from opposite sides of said processing point to circumferentially space all of said sets around said processing point and for causing reciprocal movement of said knives in each set toward said processing point to a closed cutting position and away from said processing point to an open position to enable selective energization of a set of knives properly sized to fit the gauge of the wire segment conductor then at said process point.

2. An apparatus according to claim 1 additionally comprising means for stripping said cut portion of insulation axially from the end of said wire segment conductor.

3. An apparatus according to claim 1 wherein the main frame has a portion on which said plurality of sets of cutting knives are mounted, said main frame portion lying in a first plane which is at right angles to said path of travel of said wire segment.

4. An apparatus according to claim 3 wherein said means for mounting each of said sets of cutting knives for reciprocating movement on said main frame portion lies in a second plane which is in spaced parallel relation to said first plane.

5. An apparatus according to claim 1 wherein said means for reciprocally mounting each of said sets of knives and for causing reciprocal movement of said knives to said closed and open positions comprises:
    first and second transducers each having a cylinder member and a piston member reciprocally mounted in said cylinder member;
    attachment means for securing one of said members on said frame for movement relative thereto; and
    a knife fastening means securing the other of said members to said cutting knife.

6. An apparatus according to claim 5 wherein
    each of said piston members of said set is secured in a fixed position relative to said frame;
    each of said cylinder members of said set is secured to said frame for reciprocating movement relative to said frame; and
    each of said knives is secured to one of said cylinder members to reciprocate therewith to said closed and open positions.

7. An apparatus according to claim 5 wherein:
    said attachment means, for securing said member of said first transducer of a set, fixedly secures said member to said frame; and
    said attachment means, for securing said member of said second transducer of said same set, adjustably secures said member to said frame for adjustment toward and away from said processing point to permit adjustment of the clearance between said knives of a set when in said closed position.

8. An apparatus for cutting and then stripping a portion of insulation from the end of a conductor in wire segments having different gauge conductors comprising:
    a main frame;
    a workstation on said frame presenting a processing point at which said wire segment will be momentarily positioned for said cutting and stripping as said segment follows a path of travel during processing;
    a plurality of sets of cutting and stripping knives, each of said sets of knives having a cutting edge profile sized to cut the insulation on a specific gauge of conductor;
    means for reciprocally mounting each of said sets of cutting knives on said main frame to extend radially away from opposite sides of said processing point in circumferentially spaced relation to other sets of knives positioned around said processing point and for causing reciprocal movement of said knives in each set toward said processing point to a closed position to cut said insulation and away from said processing point to an open position to enable selective actuation of a set of knives during operation properly sized to fit the gauge of the wire segment conductor then at the process point; and stripping means for causing said cut portion of insulation to be stripped axially from said conductor.

9. An apparatus according to claim 8 wherein:

a subframe is pivotally mounted on said main frame for movement relative thereto in a direction generally parallel to said path of travel;

said sets of cutting and stripping knives are mounted on said subframe; and wherein said stripping means comprises an actuator means mounted between said main frame and said subframe for selective energization when any one set of said knives is in said closed position to move said subframe in said direction to cause said closed knives to strip said cut portion of insulation axially off said end of the conductor of the wire segment then at the workstation.

10. An apparatus according to claim 9 wherein said subframe is mounted on said main frame to extend at a generally right angle to said main frame and to said path of travel of said wire segment.

11. An apparatus according to claim 9 wherein said plurality of sets of cutting and stripping knives are mounted on said subframe and wherein said subframe lies in a first plane which is at right angles to said path of travel of said wire segment.

12. An apparatus according to claim 11 wherein said means for reciprocally mounting each of said sets of cutting knives for reciprocating movement on said subframe lies in second plane which is in spaced parallel relation to said first plane.

13. An apparatus according to claim 9 wherein said means for reciprocally mounting each of said sets of knives and for causing reciprocal movement of said knives to said closed and open positions comprises:

first and second transducers each having a cylinder member and a piston member reciprocally mounted in said cylinder member;

attachment means for securing one of said members on said frame for movement relative thereto; and a fastening means securing the other of said members to said cutting knife.

* * * * *